No. 893,942.

E. B. SELLEW.
TOOL HOLDER.
APPLICATION FILED FEB. 20, 1907.

PATENTED JULY 21, 1908.

2 SHEETS—SHEET 1.

WITNESSES:
Chas. H. Luther Jr.
Ada E. Vaquette

INVENTOR:
Ernest B. Sellew
Joseph H. Miller
ATTORNEYS

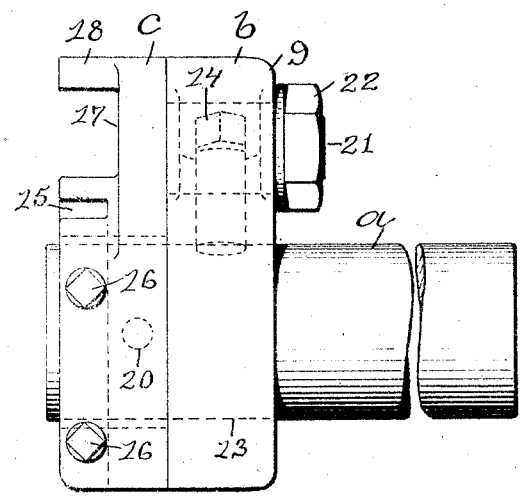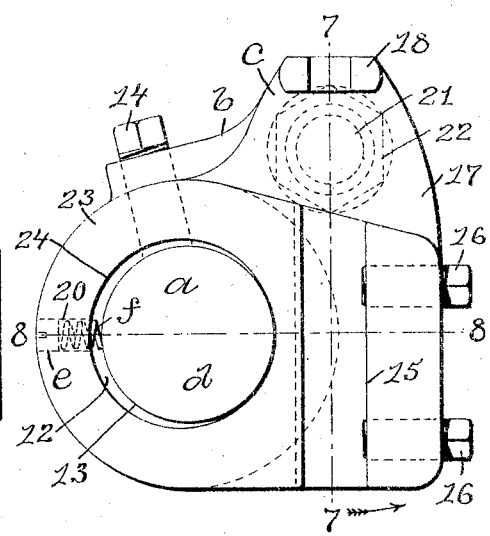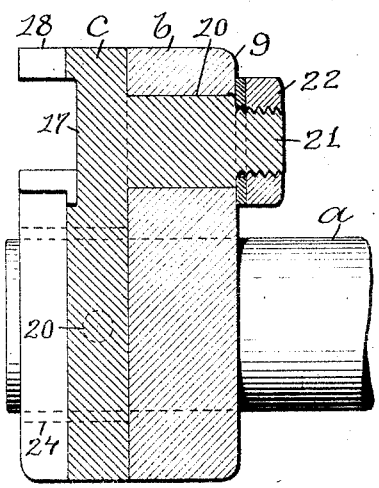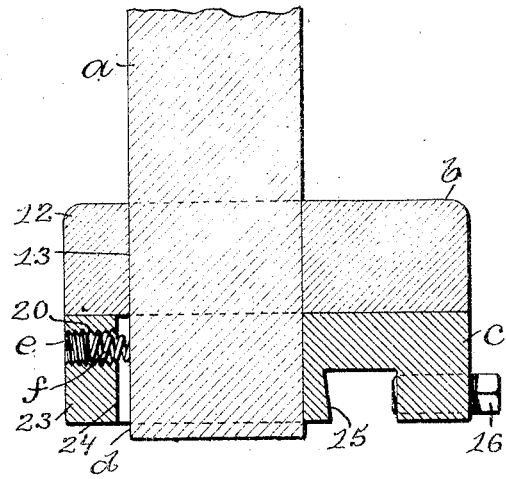

UNITED STATES PATENT OFFICE.

ERNEST B. SELLEW, OF PAWTUCKET, RHODE ISLAND.

TOOL-HOLDER.

No. 893,942.  Specification of Letters Patent.  Patented July 21, 1908.

Application filed February 20, 1907. Serial No. 358,510.

*To all whom it may concern:*

Be it known that I, ERNEST B. SELLEW, a citizen of the United States, residing at Pawtucket, in the county of Providence and State of Rhode Island, have invented a new and useful Improvement in Tool - Holders, of which the following is a specification.

This invention has reference to an improvement in metal working appliances and more particularly to an improvement in tool holders for turret lathes or similar metal working machines.

Tool holders for lathes were heretofore constructed to hold the tool as rigidly as possible in all directions and were secured to the turret of the lathe in the usual way. In turning cylinders or similar work the shank of the tool holder is required to be comparatively long. Under the working or cutting condition of the tool the strain of the work on the tool will twist the shank of the holder, thus allowing the cutting edge of the tool to spring away from the work and decreasing the depth of the cut on the forward movement of the tool. On the backward movement of the tool the cutting strain is removed from the tool and the shank of the holder twisting back or resuming its normal condition forces the cutting edge of the tool against or into the work, thus marring or ruining the finished surface of the work.

The object of my invention is to improve the construction of a tool holder for turret lathes or similar machines, whereby the cutting edge of the tool is automatically moved away from the surface of the work after the tool has completed its cut, or on the backward movement of the tool a distance which will more than compensate for the return movement of the tool holder due to the shank of the holder twisting back or resuming its normal condition.

My invention consists in the peculiar and novel construction of an automatic tool holder for metal working machines said tool holder having details of construction, as will be more fully set forth hereinafter and claimed.

Figure 1:
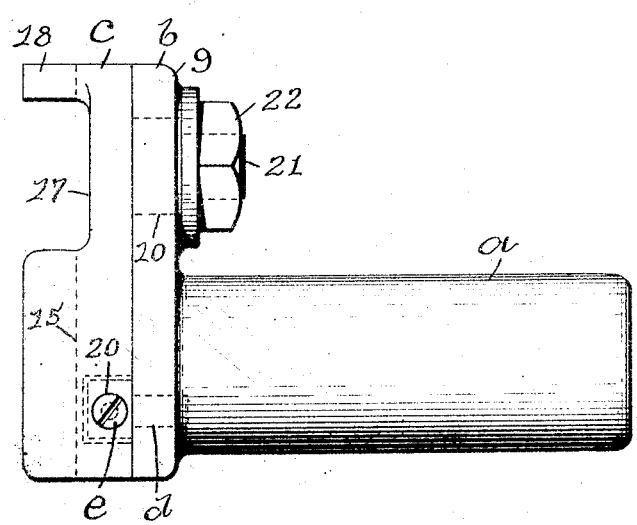

Figure 1 is a side view of my improved automatic tool holder, showing the head member formed integral with the shank member.

Figure 2:
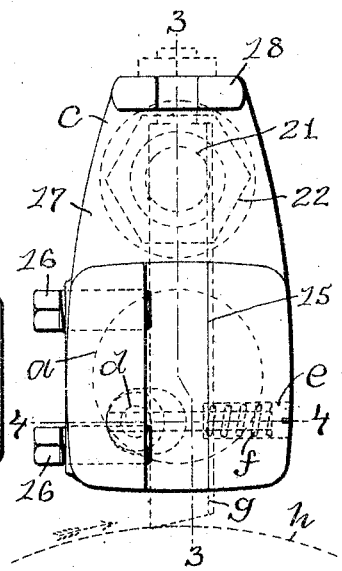
Figure 3:
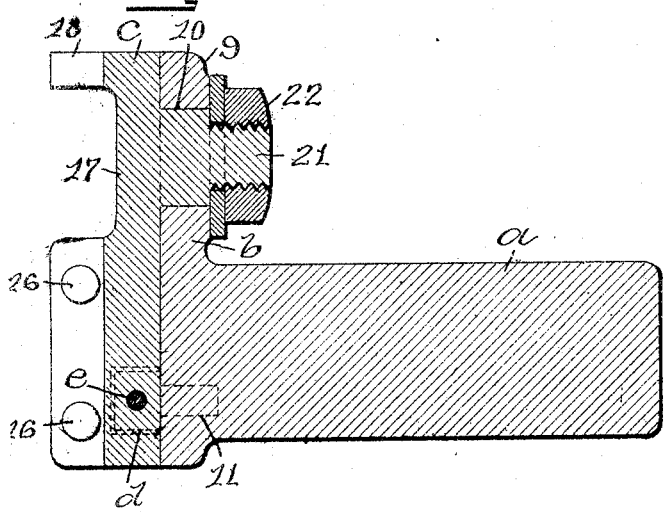
Figure 4:
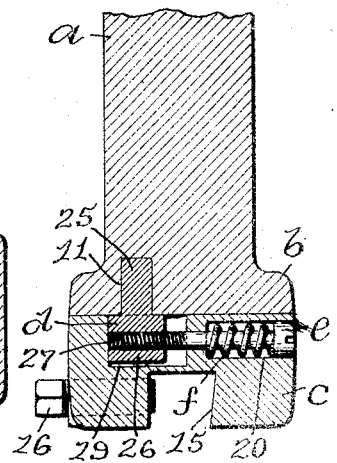

Fig. 2 is an end view of the tool holder, showing the holder in the position it would automatically assume with the tool in the cutting position, a tool in broken lines secured in the holder and a portion of the peripheral surface of a cylinder indicated in broken lines to illustrate the operation of the holder. Fig. 3 is a vertical longitudinal sectional view taken on line 3 3 of Fig. 2 through the holder, showing the tool holding member pivotally secured to the head member. Fig. 4 is a horizontal sectional view through the holder taken on line 4 4 of Fig. 2, showing the means for holding the tool in its cutting position and the means for automatically moving the tool out of its cutting position after the cutting strain has been removed from the tool. Fig. 5 is a side view of a form of automatic tool holder in which the head member with the tool holding member is adjustably secured to the shank. Fig. 6 is an end view of Fig. 5, showing the tool holder in its normal position or in the position it would assume to automatically move the tool away from the work. Fig. 7 is a vertical sectional view taken on line 7 7 of Fig. 6, through the holder, showing the tool holding member pivotally secured to the adjustable head member, and Fig. 8 is a horizontal sectional view taken on line 8 8 of Fig. 6, showing the means for holding the tool in its cutting position and the means for automatically moving the tool out of its cutting postion, after the tool has completed its cut.

In the drawings, *a* indicates the shank member which is in the form of a round bar, *b* the head member, *c* the tool holding member, *d* the stop member, *e* the screw, and *f* the coiled spring of my improved automatic tool holder.

The head member *b* is constructed to have an upwardly-extending end 9 in which is a round hole 10, a smaller off-center hole 11 under the same which extends through the head into the shank *a*, as shown in Fig. 4, and as shown in Figs. 1, 2, 3 and 4 is formed integral with the shank. The head member *b'*, as shown in Figs. 5, 6, 7 and 8, has the off-center semi-circular portion 12' through which is a round hole 13' for the shank *a'* and a set bolt 14' for securing the head to the shank. In this form a plurality of head members with the tool holding members may be secured in any position required to the shank $a'$.

The tool holding member $c$ is shaped to conform to the head $b$ and has a vertical slot 15 in the face of the member for a cutting tool, the tool clamping screws 16 16, a recessed portion 17 forming the bifurcated lug 18 in which the rear end of the tool is adjustably secured, a cavity 19 extending inward from the inner face of the member, the walls of the cavity acting as stops on the stop member $d$ to limit the movement of the tool holding member in either direction, a transverse hole 20 extending inward from the side of the member, a screw-threaded stud 21 extending through the hole 10 in the head $b$ and a nut 22 on the stud, whereby the tool holding member $c$ is pivotally secured to the head member $b$, as shown in Figs. 1, 2, 3 and 4.

As shown in Figs. 5, 6, 7 and 8 the tool holding member $c'$ has the semi-circular portion 23' shaped to conform to the semi-circular portion 12' of the head $b'$ and having the round hole 24' for the shank $a'$. This hole 24' is sufficiently large to allow for the required movement of the tool holding member $c'$ and the wall forming the hole acts as stops on the shank $a'$ (which now forms a stop member $d'$) to limit the movement of the tool holding member in either direction.

The stop member $d$, as shown in Figs. 1, 2, 3 and 4 is in the form of a stud having the stem 25 for the hole 11 in the head, the enlarged end 26 adapted to enter the cavity 18 in the tool holding member $c$ and having the screw-threaded transverse hole 27 for the screw $e$.

The coiled spring $f$ is placed on the screw $e$ and the screw inserted into the transverse hole 20, then through a smaller hole forming a shoulder for the spring and is screwed into the screw-threaded hole 27 in the stud $d$, thus bringing the spring intermediate the shoulder and the head of the screw, as shown in Figs. 1, 2, 3 and 4. The tension of the spring $f$ acts to hold the tool holding member $c$ in its normal position with the cutting edge of the tool away from the work. As shown in Figs. 5, 6, 7 and 8, a screw-threaded transverse hole 20' is formed in the semi-circular portion 23' of the tool holding member $c'$, a coiled spring inserted in the hole against the shank $a'$ and a screw $e'$ screwed into the hole 20' against the spring, the tension of the spring acting to hold the tool away from the work.

In the operation of my improved automatic tool holder a cutting tool $g$ is secured in the tool holding member $c$, as shown in broken lines in Fig. 2, and the shank $a$ of the holder secured in the turret of the lathe in the usual way. The work, which may be a cylinder, the peripheral surface $h$ of which is indicated in broken lines, turns in the direction of the arrow, as shown in broken lines in Fig. 2. When the cutting edge of the tool is brought into engagement with the work, the strain of the work on the tool forces the tool and the tool holding member $c$ into the position, as shown in Fig. 2, against the tension of the spring $f$ and the wall of the cavity 19 against the stop member $d$, as shown in Fig. 4. The tool is now rigidly held in a position to give the required depth of cut. At the end of the cut on the return movement of the tool, the strain of the work on the tool is removed. The tool holding member $c$ resumes its normal position through the tension of the spring $f$ and the cutting edge of the tool is automatically moved out of engagement with the work.

Having thus described my invention, I claim as new and desire to secure by Letters Patent:—

1. In an automatic tool holder, the combination of a shank member, a head member secured thereto, a tool holding member pivotally secured to the head member, a stop member carried by the head member and adapted to engage with stop shoulders provided in said tool holding member, a screw extending through a shouldered hole provided therefor in the tool holding member and screwed into said stop member, and a coil spring on the screw between the shoulder and the head of said screw.

2. In combination with a shank member, a head member secured at right angles to said shank member, a tool holding member pivoted to the outer face of said head member at a point beyond said shank member, a stop carried by the head member and projecting in an opening provided therefor in the tool holding member, a spring, and means sustained from said stop and carrying said spring, said spring engaging the tool holding member.

3. In combination with a shank member, a head member secured thereto, at one end and extending at right angles therefrom, a tool holding member pivoted to the outer face of said head member, a stop projecting outwardly from said outer face of the head member and extending in a shouldered opening provided therefor in said tool holding member, a headed screw fastened to said stop and having a portion thereof projecting in a shouldered opening provided therefor in said tool holding member, and a coil spring surrounding said screw and abutting the head thereof and the shoulder of said last named opening.

4. In an automatic tool holder, a shank, a head member thereon formed with an upwardly extending end having an operating face at right angles to the axis of said shank, a spring pressed tool holding member pivoted to said upwardly extending end of said head member at a point remote from said shank and having a sliding movement against said operating face at right angles to the axis of said shank, and a stop to engage said tool holding member, and means on the front face of the tool holding member to support a tool.

In testimony whereof I have signed my name to this specification in the presence of two subscribing witnesses.

ERNEST B. SELLEW.

Witnesses:
J. A. MILLER,
ADA E. HAGERTY.